United States Patent [19]
Park et al.

[11] 3,950,318
[45] Apr. 13, 1976

[54] PRODUCTION OF POLYMERS
[75] Inventors: Anthony John Park, South Croydon; Alan Charles Sturt, Guildford; Richard Harvey Williams, Horsham, all of England
[73] Assignee: BP Chemicals International Limited, London, England
[22] Filed: Mar. 21, 1975
[21] Appl. No.: 560,340

Related U.S. Application Data
[63] Continuation of Ser. No. 384,716, Aug. 1, 1973.

[30] Foreign Application Priority Data
Mar. 29, 1973  United Kingdom............... 15167/73

[52] U.S. Cl....... 260/92.8 A; 260/87.1; 260/87.5 C; 260/87.7; 260/92.8 W
[51] Int. Cl.² .................... C08F 2/18; C08F 2/24
[58] Field of Search........ 260/92.8 A, 92.8 W, 87.1, 260/87.5, 87.7

[56] References Cited
UNITED STATES PATENTS
3,642,740   2/1972   Pierce, Jr.......................... 260/87.5
FOREIGN PATENTS OR APPLICATIONS
1,102,980   2/1968   United Kingdom........... 260/92.8 W
  870,063   5/1971   Canada.......................... 260/92.8 A OTHER PUBLICATIONS
Smith, W. M., Vinyl Resins, Reinhold Publ. N.Y. pp. 97–98.

Primary Examiner—John Kight, III
Attorney, Agent, or Firm—Brooks Haidt Haffner & Delahunty

[57]        ABSTRACT
A vinyl halide paste polymer of low viscosity may be produced by adding an alkaryl sulphonate emulsifier to the polymer latex after polymerisation but before isolation. This gives a polymer which can be made into a paste in known fashion.

10 Claims, No Drawings

PRODUCTION OF POLYMERS

This is a continuation, of application Ser. No. 384,716, filed Aug. 1, 1973.

The present invention relates to a process for the production of a vinyl halide paste forming polymer.

Paste forming vinyl halide polymers are well known. They are derived from vinyl halide polymer latices. The polymers are normally recovered from such latices by spray-drying, and then ground and mixed with plasticisers to form smooth pastes which can be spread or moulded and finally formed into fabricated solid products by heating. A very important property of the pastes in the paste viscosity, which for example in a high speed coating process largely controls the speed at which the paste can be spread. In this type of process low viscosity may therefore be required. The major factor in controlling viscosity is particle size and distribution but it is known to add glycol ethers to the polymer latex before spray-drying to depress the paste viscosity. Paste viscosity varies with the shear applied, and for high speed spreading applications it is important that the viscosity at high shear should be low.

It is an object of the present invention to produce an improved paste polymer.

Accordingly, the present invention is a process for the production of a vinyl halide paste forming polymer which process comprises adding an alkaryl sulphonate emulsifier to a paste forming vinyl halide polymer latex after polymerisation to form the latex is substantially complete and isolating the paste forming polymer is the presence of said emulsifier.

Any alkaryl sulphonate, emulsifier may be used. Preferred alkaryl sulponates are alkylbenzore sulphonates containing from 6 to 20 carbon atoms in the alkyl group. Particularly preferred are octyl, ronyl, decyl or dedecyl benzene sulphonates. The sulphonates are suitably added to the latex in the form of their water soluble salts, the preferred salts being the ammonium salts.

Particularly preferred alkyl ether sulphates are the salts of alkyl ether sulphates having 6 to 22 most preferably 8 to 16 carbon atoms per molecule.

Preferred sulphonsuccinates are the esters having from 2 to 22 and most preferably from 4 to 16 carbon atoms per molecule.

As little as 0.1% of emulsifier by weight of polymer may have a useful effect but 0.25% by weight and most preferably in the range 0.4 to 1.0% is added. These preferred levels are appropriate when the emulsifiers are used alone or mixed with each other. Lower levels may be used if the emulsifier is used together with known glycol ether viscosity depressants. The emulsifier must be added to the latex after polymerisation to form the latex is substantially complete and is thus distinct from the emulsifier used to disperse the monomer from which the latex is formed. It should be added before isolation as it is thought to be necessary to coat the polymer particles with the emulsifier which cannot be conveniently achieved after isolation. The temperature at which the emulsifier is added is not critical and temperatures in the range 5°-95°C are perfectly suitable.

The vinyl halide paste forming polymer may contain up to 30% by weight of copolymerised monomer. Examples of copolymerisable monomers are ethylene, propylene, vinyl acetate, vinyl laurate, vinyl stearate and vinylidene chloride. The process of the present invention is particularly applicable to latices of homopolymers of vinyl chloride and copolymers of vinyl chloride with less than 20% by weight of other copolymerisable materials.

The latex may be any suitable latex of paste forming polymer prepared by emulsion or micro-suspension polymerisation in well-known fashion. Particularly suitable are latices prepared by the microsuspension techniques where a monomer soluble initiator is used, or large particle size latices prepared by seeding or by continuous polymerisation using water soluble initiators.

The paste forming polymer may be isolated by any technique that does not involve separation of the added emulsifier from the polymer. It will be appreciated that during the isolation procedure the precise chemical form of the emulsifier may be changed. However, so long as the emulsifier or its essential residue, e.g. the sulphonic acid residue of a sulphonate emulsifier remains with the polymer, good results are obtained. The most usual method is to spray dry the latex. After spray drying it is usually necessary to grind the polymer to break up large agglomerates which may effect the spreading process or otherwise spoil the final product.

Pastes can be made from paste forming polymers produced according to the present invention by mixing with plasticisers in well-known fashion. It is generally found that with the paste forming polymers of the present invention the viscosity of the paste formed is reduced compared with the addition of the same amount of emulsifier during polymerisation. The reduction in viscosity is however, sometimes subject to an ageing effect. For example, the viscosity of the paste may increase on standing. However, the addition of the emulsifier tends to reduce the variation of viscosity ageing of the paste.

The following illustrate the process of the present invention and the properties of the products thereof.

EXAMPLE I

A latex was made by the micro-suspension techniques using sodium lauryl sulphate as the major emulsifier. Latex particles up to 1.5µ in diameter were obtained. The latex was dried on a Kestner spray drier with air temperatures of 130°C (inlet) and 60°C (outlet). The dried polymer was ground by an Alpine pin mill. A plastisol was prepared by mixing the ground polymer (100 parts by wt.) with dioctyl phthalate (60 parts by wt.) in a Hobart mixer. An exactly parallel operation was carried out on another portion of the same latex to which a solution of one part (dry wt. on dry wt. PVC) of sodium dodecyl benzene sulphonate (Nansa SS-Trade Name) has been added.

The viscosities of two plastisols were measured after ageing for 1.24 and 168 hours using a Haake Rotovisko viscometer fitted with cone and plate and a Brookfield model RVT viscometer. The results are shown below in Table 1;-

Table 1

| Ex. | Nansa SS added to latex (parts) | Brookfield (20 rpm) Viscosity (Nsm$^{-2}$) | | | Rotovisko Viscosity (1000s$^{-1}$) cone and plate (Nsm$^{-2}$) | | |
|---|---|---|---|---|---|---|---|
| | | 1 hr. | 24 hr. | 168 hr. | 1 hr. | 24 hr. | 168 hr. |
| — | Nil | 19.5 | 23.2 | 28.8 | 13.9 | 14.0 | 17.5 |
| 1 | 1 | 7.0 | 9.4 | 13.7 | 9.7 | 9.8 | 10.7 |

The addition of Nansa SS clearly reduced plastisol viscosity. By way of contrast one part of sodium lauryl sulphate (Empicol LXV) was used in place of the Nansa SS in the same latex as in Example 1 and the same operations of drying, grinding and making a plastisol were carried out. The Brookfield viscosity (20 r.p.m.) of this plastisol was 42.2 Nsm$^{-2}$ after 1 hr. 42.7 Nsm$^{-2}$ after 24 hr. and 59.4 Nsm$^{-2}$ after 168 hrs. The addition of sodium lauryl sulphate had doubled the viscosities.

EXAMPLE 2

A latex was made by the micro-suspension technique using sodium lauryl sulphate as the major emulsifier. The latex was dried, ground and madee into a plastisol as in Example 1, and the Brookfield viscosity (20 r.p.m.) of the plastisol was 14.6 Nsm$^{-2}$ after 1 hour. An exactly parallel operation was carried out on another portion of the same latex to which a solution of one part of ammonium dodecyl benzene sulphonate (dry wt. on dry wt. PVC) had been added. The equivalent viscosity of the plastisol was 5.9 Nsm$^{-2}$, so that the ammonium dodecyl benzene sulphonate had reduced the viscosity by more than a factor of three.

Comparative Tests 1 and 2

A PVC homopolymer latex was made by conventional emulsion polymerisation techniques using ammonium laurate as emulsifier in the same way as in Example 3. The particle size of the latex was about 0.2$\mu$. The latex was divided into three aliquots. To one aliquot a solution of Warolat U (C$_{16}$ - C$_{18}$ alkyl sulphonate made by Farbenfabriken Bayer) was added with stirring to give a ratio of 1 part Warolat U/100 parts PVC by weight. To a second aliquot a solution of potassium laurate was added to give a similar ratio. The three aliquots were then spray-dried in a Kestner Laboratory spray drier with air temperatures of 130°C (input) and 60°C (output). Plastisols were made from the dried materials by mixing 100 parts of the polymers with 82 parts by weight of dioctyl phthalate in a Hobart mixer. Plastisol viscosity measurements were made after 1 hr. using a Haake Rotovisko fitted with a cup and bob at a shear rate of 1s$^{-1}$. The results were as follows:-

| | |
|---|---|
| No post-addition | 24.7 Nsm$^{-2}$ |
| Post-addition with Warolat U | 29.5 Nsm$^{-2}$ |
| Post-addition with potassium laurate | 79.5 Nsm$^{-2}$ |

These post-additives did not reduce paste viscosities.

We claim:

1. A process for the production of a vinyl halide paste forming polymer which comprises preparing a vinyl halide polymer latex by microsuspension of a vinyl halide monomer using an alkali-metal salt of an alkyl sulfuric acid as the major emulsifier, adding an aralkyl sulphonate emulsifier to said latex after polymerisation to form said latex is substantially complete, and isolating said polymer in the presence of said aralkyl sulphonate emulsifier.

2. A process according to claim 1 where the emulsifier is an alkyl benzene sulphonate emulsifier containing from 6 to 20 carbon atoms in the alkyl group.

3. A process according to claim 1 where the amount of emulsifier used lies in the range 0.4 to 1.0% by weight.

4. A process according to claim 1 where the latex is of a homopolymer of vinyl chloride or a copolymer of vinyl chloride with less than 20% by weight of other copolymerisable materials.

5. A process according to claim 1 where the latex has been prepared by micro-suspension polymerisation.

6. A process according to claim 1 where the latex is isolated by spray drying.

7. A process according to claim 1 where the polymer is ground after spray drying.

8. A process according to claim 1, wherein the aralkyl sulphonate is an octyl, nonyl, decyl or dodecyl benzene sulphonate.

9. A process according to claim 1, wherein the aralkyl sulphonate emulsifier is sodium dodecyl benzene sulphonate.

10. A process according to claim 1, wherein said major emulsifier is sodium lauryl sulphate. --

* * * * *

UNITED STATES PATENT OFFICE
CERTIFICATE OF CORRECTION

PATENT NO. : 3,950,318
DATED : April 13, 1976
INVENTOR(S) : Anthony John Park, Alan Charles Sturt and Richard Harvey Williams It is certified that error appears in the above-identified patent and that said Letters Patent are hereby corrected as shown below:

Col. 1, line 15, after "pastes" change "in" to --is-- line 37, correct the spelling of "alkylbenzene"

line 39, delete "ronyl" and substitute "nonyl" therefor

Line 40, "dedecyl" should read --dodecyl-- line 52, "0.25%" should read --0.2%--

Col. 2, line 46, after "following" and before "illustrate" insert --examples-- line 52, after "1.5µ" insert --m--

Col. 3, line 24, correct the spelling of "made"

line 31, "5.9 Nsm$^{-2}$" should read: --3.9 Nsm$^{-2}$-- line 40, after "0.2µ" insert --m--

Signed and Sealed this

Twentieth Day of July 1976

[SEAL]

Attest:

RUTH C. MASON
*Attesting Officer*

C. MARSHALL DANN
*Commissioner of Patents and Trademarks*